US008400998B2

(12) United States Patent
Kuchibhotla et al.

(10) Patent No.: US 8,400,998 B2
(45) Date of Patent: Mar. 19, 2013

(54) DOWNLINK CONTROL CHANNEL SIGNALING IN WIRELESS COMMUNICATION SYSTEMS

(75) Inventors: Ravi Kuchibhotla, Gurnee, IL (US);
Brian K. Classon, Palatine, IL (US);
Robert T. Love, Barrington, IL (US);
Ravikiran Nory, Grayslake, IL (US);
Philippe J. Sartori, Algonquin, IL (US);
Kenneth A. Stewart, Grayslake, IL (US); Yakun Sun, Evanston, IL (US);
Anup K. Talukdar, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 838 days.

(21) Appl. No.: 11/466,720

(22) Filed: Aug. 23, 2006

(65) Prior Publication Data

US 2008/0049690 A1 Feb. 28, 2008

(51) Int. Cl.
*H04B 7/212* (2006.01)
(52) U.S. Cl. ........ 370/348; 370/338; 370/319; 370/349; 375/260; 455/450; 455/458
(58) Field of Classification Search .................. 370/338, 370/348, 319, 349, 203, 208, 431, 436; 375/260; 455/450, 458
See application file for complete search history.

(56) References Cited

U.S. PATENT DOCUMENTS

| | | |
|---|---|---|
| 5,177,739 A | 1/1993 | Basnuevo et al. |
| 5,396,496 A | 3/1995 | Ito et al. |
| 5,530,920 A | 6/1996 | Takeda |
| 5,537,410 A | 7/1996 | Li |
| 5,732,113 A | 3/1998 | Schmidl et al. |
| 5,771,226 A | 6/1998 | Kaku |
| 5,784,683 A | 7/1998 | Sistanizadeh et al. |
| 5,796,726 A | 8/1998 | Hassan et al. |
| 5,991,279 A | 11/1999 | Haugli et al. |
| 6,064,662 A | 5/2000 | Gitlin et al. |
| 6,115,354 A | 9/2000 | Weck |
| 6,130,886 A | 10/2000 | Ketseoglou et al. |
| 6,185,208 B1 | 2/2001 | Liao |
| 6,192,070 B1 | 2/2001 | Poon et al. |
| 6,356,555 B1 | 3/2002 | Rakib et al. |
| 6,535,550 B1 | 3/2003 | Cole |

(Continued)

FOREIGN PATENT DOCUMENTS

| | | |
|---|---|---|
| EP | 1379020 A1 | 1/2004 |
| EP | 1450505 B1 | 10/2008 |

(Continued)

OTHER PUBLICATIONS

Yaghoobi, Hassan: "Scalable OFDMA Physical Layer in IEEE 802.16 Wireless MAN", Aug. 20, 2004, Intel Technology Journal, vol. 8, No. 3, pp. 201-212.*

(Continued)

*Primary Examiner* — Kamran Afshar
*Assistant Examiner* — Yousef R Rod

(57) ABSTRACT

A method in a wireless communication terminal (103) including receiving a plurality of sub-frames having time-frequency resource elements and resource allocation fields associated with a corresponding sub-frame, wherein the resource allocation fields indicate a resource assignment. In another embodiment, terminal receives a radio frame comprising a plurality of sub-frames and a frequency diverse allocation field indicating frequency diverse resource allocations in multiple sub-frames of the radio frame.

20 Claims, 3 Drawing Sheets

U.S. PATENT DOCUMENTS

| | | |
|---|---|---|
| 6,549,592 B1 | 4/2003 | Jones |
| 6,567,416 B1 | 5/2003 | Chuah |
| 6,813,284 B2 | 11/2004 | Vayanos et al. |
| 6,827,590 B2 | 12/2004 | Huss, Jr. et al. |
| 6,868,519 B2 | 3/2005 | Beacken et al. |
| 6,876,675 B1 | 4/2005 | Jones et al. |
| 6,885,630 B2 | 4/2005 | Kostic et al. |
| 6,985,433 B1 | 1/2006 | Laroia et al. |
| 7,139,239 B2 | 11/2006 | McFarland |
| 7,142,888 B2 | 11/2006 | Okawa et al. |
| 7,215,677 B2 | 5/2007 | Lung |
| 7,302,014 B1 | 11/2007 | Barsoum |
| 7,366,117 B2 | 4/2008 | Kim et al. |
| 7,426,196 B2 | 9/2008 | Gopalakrishnan et al. |
| 7,522,514 B2 | 4/2009 | Tzannes et al. |
| 7,609,697 B2 | 10/2009 | Nishida et al. |
| 2001/0017596 A1 | 8/2001 | Strinnholm |
| 2002/0003773 A1 | 1/2002 | Okada et al. |
| 2002/0031086 A1 | 3/2002 | Welin |
| 2002/0075893 A1 | 6/2002 | Gipson et al. |
| 2002/0118666 A1* | 8/2002 | Stanwood et al. ......... 370/345 |
| 2002/0119781 A1* | 8/2002 | Li et al. ................. 455/450 |
| 2002/0122395 A1 | 9/2002 | Bourlas et al. |
| 2002/0126706 A1 | 9/2002 | Laroia et al. |
| 2002/0157060 A1 | 10/2002 | Beacken et al. |
| 2003/0026348 A1 | 2/2003 | Llang et al. |
| 2003/0072255 A1 | 4/2003 | Ma et al. |
| 2003/0090994 A1 | 5/2003 | Kakura |
| 2003/0171129 A1 | 9/2003 | Sagne |
| 2003/0189918 A1* | 10/2003 | Das et al. ............... 370/349 |
| 2003/0198179 A1 | 10/2003 | Koo et al. |
| 2003/0202562 A1 | 10/2003 | Cai |
| 2004/0037263 A1 | 2/2004 | Zeira |
| 2004/0042492 A1 | 3/2004 | Suzuki et al. |
| 2004/0047296 A1 | 3/2004 | Tzannes et al. |
| 2004/0071222 A1 | 4/2004 | Liang et al. |
| 2004/0082356 A1 | 4/2004 | Walton et al. |
| 2004/0085934 A1 | 5/2004 | Balachandran et al. |
| 2004/0087320 A1 | 5/2004 | Kim et al. |
| 2004/0095907 A1 | 5/2004 | Agee et al. |
| 2004/0116079 A1 | 6/2004 | Kim et al. |
| 2004/0162075 A1 | 8/2004 | Malladi et al. |
| 2004/0213145 A1 | 10/2004 | Nakamura |
| 2005/0018754 A1 | 1/2005 | Song |
| 2005/0030927 A1 | 2/2005 | Mucke |
| 2005/0053088 A1 | 3/2005 | Cheng et al. |
| 2005/0068973 A1 | 3/2005 | Taffin et al. |
| 2005/0099936 A1 | 5/2005 | Fuji et al. |
| 2005/0111397 A1 | 5/2005 | Attar et al. |
| 2005/0135295 A1 | 6/2005 | Walton et al. |
| 2005/0153276 A1 | 7/2005 | Wikswo et al. |
| 2005/0232181 A1* | 10/2005 | Park et al. ............. 370/319 |
| 2006/0007881 A1 | 1/2006 | Kondo |
| 2006/0039409 A1 | 2/2006 | Lampinen |
| 2006/0106600 A1 | 5/2006 | Bessette |
| 2006/0176966 A1 | 8/2006 | Stewart et al. |
| 2006/0187895 A1 | 8/2006 | Nandagopalan |
| 2006/0245384 A1 | 11/2006 | Talukdar et al. |
| 2007/0058595 A1 | 3/2007 | Classon et al. |
| 2007/0066362 A1 | 3/2007 | Ma et al. |
| 2007/0133695 A1 | 6/2007 | Kotzin |
| 2007/0211657 A1 | 9/2007 | McBeath et al. |
| 2007/0214400 A1* | 9/2007 | Smith et al. ............ 714/748 |
| 2007/0274203 A1 | 11/2007 | Kimura et al. |
| 2008/0043708 A1* | 2/2008 | Muharemovic et al. ... 370/348 |
| 2008/0077837 A1 | 3/2008 | Lohr et al. |
| 2008/0137562 A1 | 6/2008 | Li et al. |
| 2008/0240022 A1 | 10/2008 | Yoon et al. |
| 2008/0247337 A1 | 10/2008 | Li et al. |
| 2009/0268695 A1* | 10/2009 | Zhao et al. ............. 370/336 |

FOREIGN PATENT DOCUMENTS

| | | |
|---|---|---|
| GB | 2322525 A | 6/1996 |
| JP | 11-355195 A | 12/1999 |
| JP | 2006505219 A | 2/2006 |
| WO | 92/11716 A1 | 7/1992 |
| WO | 0116314 A1 | 3/2001 |
| WO | 0241520 A2 | 5/2002 |
| WO | 0249305 A2 | 6/2002 |
| WO | 03077457 A1 | 9/2003 |
| WO | 2004039011 A2 | 5/2004 |
| WO | 2004039027 A2 | 5/2004 |
| WO | 2004073250 A1 | 8/2004 |
| WO | 2004097797 A1 | 11/2004 |
| WO | 2004100569 A2 | 11/2004 |
| WO | 2004/105294 A2 | 12/2004 |
| WO | 2005109705 A1 | 11/2005 |
| WO | 2006039812 A1 | 4/2006 |
| WO | 2006065069 A1 | 6/2006 |
| WO | 2006083077 A1 | 8/2006 |
| WO | 2006102746 A1 | 10/2006 |
| WO | 2006105004 A2 | 10/2006 |
| WO | 2006105005 A2 | 10/2006 |

OTHER PUBLICATIONS

Kuchibhotla et al., U.S. Appl. No. 11/539,503, filed Oct. 6, 2006.

3GPP TS 36.211 v8.7.0; Technical Specification Group Radio Access Network; E-UTRA; Physical Channels and Modulation (Release 8) May 2009, 83 pages.

3GPP TSG RAN2#55; Downlink Resource Allocation, Motorola, Inc.; Seoul, Korea Oct. 9-13, 2006; 2 pages. R2-062970.

Intel Technology Journal, IEEE 802.16 Medium Access Control and Service Provisioning; Aug. 20, 2004 96 pages.

Japanese Office Action, Japanese Patent Application No. 2007-216057, Nov. 27, 2009; 5 pages.

PCT Search Report, PCT Application No. US2007-076941, Aug. 21, 2008; 14 pages.

USPTO, Non Final Office Action, U.S. Appl. No. 11/539,503, Dec. 26, 2008 38 pages.

Motorola, Inc., Response to Non-Final Office Action, U.S. Appl. No. 11/539,503, Jun. 9, 2009, 18 pages.

USPTO, Final Rejection, U.S. Appl. No. 11/539,503, filed Sep. 17, 2009 40 pages.

Mexican Patent Application No. MX/a/2007/011789 Second Office Action dated Oct. 1, 2010, 2 pages.

U.S. Appl. No. 11/276,982 Non-Final Rejection dated Dec. 9, 2010, 36 pages.

IEEE 802.16 REVd/D5-2004, "Part 16: Air Interface for Fixed Broadband Wireless Access System", May 2004; also known as IEEE Std 802.16-2004.

IEEE 802.16e "Extended rtPS for VoIP services" dated Nov. 4, 2004.

3GPP TSG-RAN WG1 Meeting #52; Sorrento, Italy; Feb. 11-15, 2008; 36.211 CR 0003; "Update of uplink reference-signal hopping, downlink reference signals, scrabling sequences, DwPTS/UpPTS lengths to TDD and control channel processing" R1-081155.

IEEE: Std 802.16-2004 (Revision of IEEE Std 802.16-2001), 802.16 IEEE Standard for Local and metropolitan area networks, Part 16: Air Interface for Fixed Broadband Wireless Access Systems, IEEE Computer Society and the IEEE Microwave Theory and Techniques.

3rd Generation Partnership Project 2, 3GPP2, Physical Layer Standard for cdma2000 Spread Spectrum System, Revision D, 3GPP2 C.S0002-D, Version 1.0 Feb. 13, 2004, pp. 3-3, 3-15, 3-21, 3-131, to 3-140.

3GPP2 C.S0024-A. "cdma2000 High Rate Packet Data Air Interface Specification", 3GPP2 C.s0024-A Version 1.0 Mar. 2004, pp. 3-27 to 3-31, 13-1 to 13-13, 13-25 to 13-52.

3GPP TSG RAN1#45, Shanghai, China, May 8-12, 2006; EUTRA Downlink Distributed Multiplexing and Mapping Rules TP; R1-061173; XP007903801.

TS 25.322, "Radio Link Control (RLC) Protocol Specification", Version 6.2.0, Dec. 2004.

3GPP2 C.S0017-010-A, "Data Service Options for Spread Spectrum Systems: Radio Link Protocol Type 3", version 1.0, Jun. 2004.

Classon et al., "Multi-dimensional adaptation and multi-user scheduling techniques for wireless OFDM systems," in Proc. IEEE ICC 2003, pp. 2251-2255, May 2003.

Das et al, "Performance of hybrid ARQ for high speed downlink packet access in UMTS", Vehicular Technology Conference, 2001, VTCX 2001 Fall, IEEE VTS 54 vol. 4, Oct. 7-11, 2001, pp. 2133-2137, vol. 4.

Das et al, "A2IR: an asynchronous and adaptive hybrid ARQ scheme for 3G evolution", Vehicular Technology Conference, 2001, VTC 2001 Spring, IEEE VTS 53 vol. 1, May 6-9, 2001, pp. 628-632, vol. 1.

Das et al, "Adaptive, asynchronous incremental redundancy (A/sup 2/IR) with fixed transmission time intervals (TTI) for HSDPA", Personal Indoor and Mobile Radio Communications, 2002, The 13th IEEE International Symposium on vol. 3, Sep. 15-18.

Horbach, Christian, "PCT Search Report and Written Opinion" European Patent Office—Rijswikj; completed Mar. 3, 2008, mailed Mar. 14, 2008.

Olivia Marsh, "PCT—International Search Report" USPTO—ISA/US; completed Dec. 22, 2006, mailed Jan. 29, 2007.

Chi Pham, "PCT Search Report and Written Opinion" USPTO—ISA/US: completed Aug. 30, 2006, mailed Sep. 27, 2006.

Chave, J., "PCT Search Report and Written Opinion" European Patent Office—Rijswikj; completed Apr. 19, 2006, mailed Apr. 26, 2006.

The Federal Service for Intellectual Property, Patents and Trade Marks, "Decision on Grant Patent for Invention" for Russian Application No. 2009110200/08(013844) date Jun. 24, 2011, 5 pages.

United States Patent and Trademark Office, "Non-Final Rejection" for U.S. Appl. No. 11/052,700 dated Jul. 28, 2011, 10 pages.

Japanese Patent Office, "Office Action" for Japanese Patent Application No. 2011-095291 dated Oct. 10, 2012, 4 pages.

* cited by examiner

DOWNLINK CONTROL CHANNEL SIGNALING IN WIRELESS COMMUNICATION SYSTEMS

FIELD OF THE DISCLOSURE

The present disclosure relates generally to wireless communications and more particularly to downlink control channel signaling over shared channels in wireless communication networks, corresponding entities and methods.

BACKGROUND

In the Long Term Evolution (LTE) of UMTS Terrestrial Radio Access (UTRA) and UTRA Network (UTRAN) specifications, multiple approaches for scheduling downlink data transmission are being proposed. In particular, time division multiplexing (TDM) and frequency division multiplexing (FDM) methods, including hybrids thereof, have been proposed in addition to separate and joint coding of control channel signaling. In TDM or FDM transmissions of control channel signaling, the control information for downlink and uplink assignments may be transmitted over the first one or two symbols of the downlink frame or may be spread out over the length of a sub-frame, which may be, for example, of 0.5 ms duration, though other values are also possible. In jointly coded downlink and uplink control information schemes, all the control information relates to the sub-frame carrying the control information. A duration field has been proposed to indicate the validity of the current assignment in one sub-frame for subsequent, adjacent sub-frames. All these proposed methods however deal with controlling data transmission based on a sub-frame of 0.5 ms and a transmission time interval (TTI) that is a multiple of 0.5 ms.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
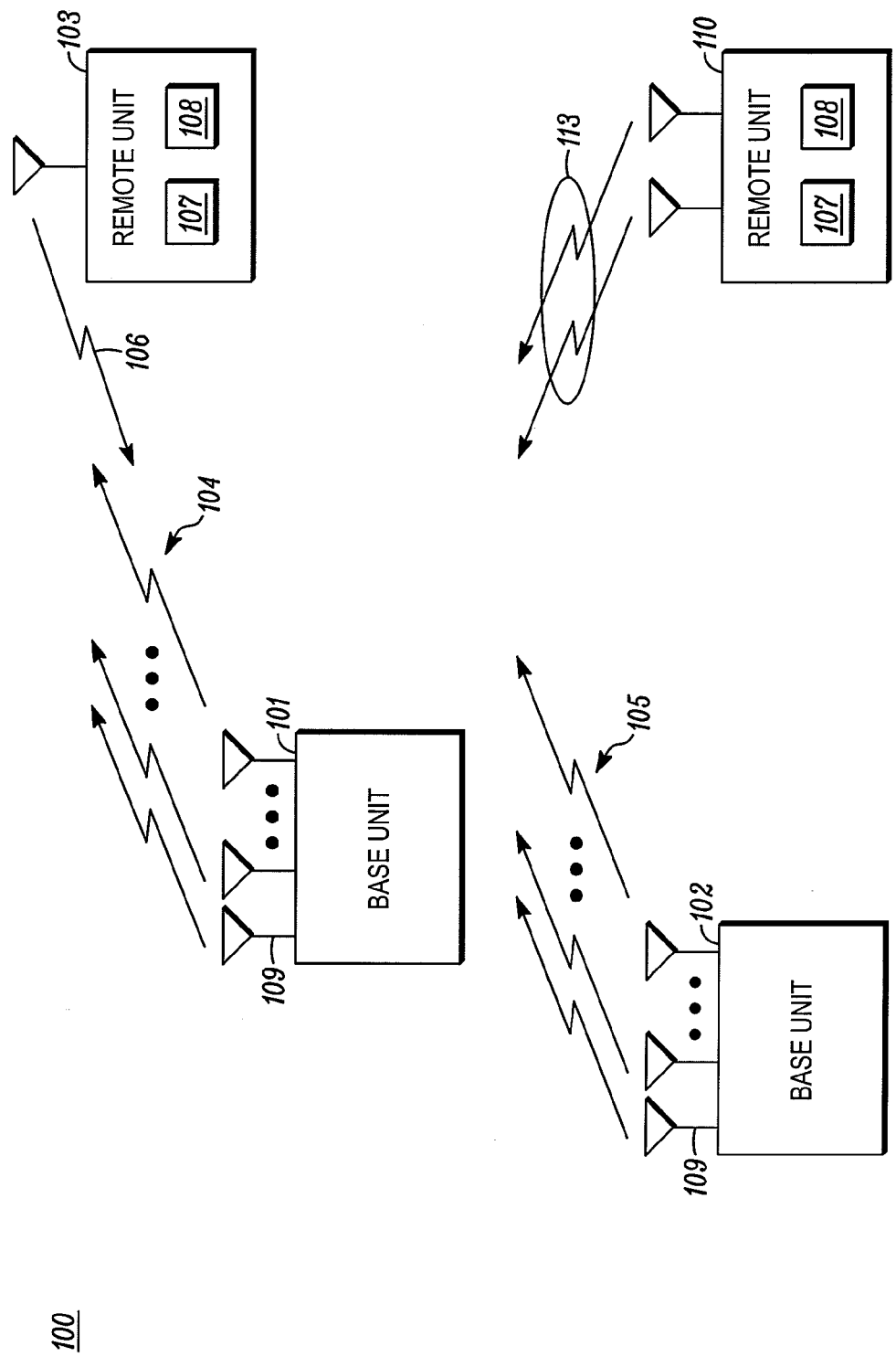
FIG. 1 illustrates a wireless communication system.

In FIG. 1, a wireless communication system 100 comprises multiple cell serving base stations forming a cellular network distributed over a geographical region, wherein each cell may comprise one or more sectors. In one embodiment, the communication system utilizes OFDMA or a next generation single-carrier based FDMA architecture for uplink transmissions, such as interleaved FDMA (IFDMA), Localized FDMA (LFDMA), DFT-spread OFDM (DFT-SOFDM) with IFDMA or LFDMA.

Single-carrier based FDMA approaches are attractive in that they improve performance when assessed using contemporary waveform quality metrics, which may include peak-to-average power ratio (PAPR) or the so-called cubic metric (CM). These metrics are good indicators of power backoff or power de-rating necessary to maintain linear power amplifier operation, where "linear" generally means a specified and controllable level of distortion both within the signal bandwidth generally occupied by the desired waveform and in neighboring frequencies. While these SC-FDMA approaches can be classified as single-carrier based transmission schemes with a much lower peak-to-average power ratio than OFDM, they can also be classified as multi-carrier schemes because they are block-oriented like OFDM and can be configured to occupy only a certain set of "sub-carriers" in the frequency domain like OFDM. Thus IFDMA and DFT-SOFDM can be classified as both single-carrier and multi-carrier since they have single carrier characteristics in the time domain and multi-carrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques.

In order to retain the low PAPR or CM property of IFDMA/DFT-SOFDM, only a single IFDMA code could be transmitted by each user which leads to a time division multiplexing (TDM) of pilot or reference symbol blocks, where data and pilots of a particular user are not mixed within the same symbol block. This allows the low PAPR property to be preserved and also enables the pilot to remain orthogonal from the data in multi-path channels, since there is conventionally a cyclic prefix between blocks.

In FIG. 1, the one or more base units 101 and 102 comprise one or more transmitters and one or more receivers that serve a number of remote units or terminals within a sector. The number of transmitters may be related, for example, to the number of transmit antennas 109 at the base unit. The base units 101 and 102 communicate with remote units 103 and 110 and perform functions such as scheduling the mobile terminals to receive or transmit data using available radio resources. A base unit may also be referred to as an access point, access terminal, Node-B, or by similar terminologies from the art. A remote unit comprises one or more transmitters and one or more receivers. The number of transmitters may be related, for example, to the number of transmit antennas at the remote unit. A remote unit may also be referred to as a subscriber unit, a mobile unit, a user, a terminal, a subscriber station, user equipment (UE), a user terminal or by similar terminology in the art. The network also comprises management functionality including data routing, admission control, subscriber billing, terminal authentication, etc., which may be controlled by other network entities, as is known generally by those having ordinary skill in the art. When multiple antennas are used to serve each sector to provide various advanced communication modes (e.g., adaptive beam-forming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time and/or frequency). Remote units 103 and 110 communicate with one or more base units 101 and 102 via uplink communication signals 106 and 113.

Generally, a wireless communication network infrastructure scheduling entity located, for example, in a base station 101, 102 in FIG. 1, allocates or assigns radio resources to wireless communication entities in the wireless communication network. The base stations 101, 102 each include a scheduler for scheduling and allocating resources to mobile terminals in corresponding cellular areas. In multiple access schemes such as those based on OFDM methods and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. In some embodiments, each mobile terminal may provide a per frequency band channel quality indicator (CQI) to the base station scheduler to enable FS scheduling.

In OFDM systems or OFDM like systems such as DFT-SOFDM and IFDMA, a resource allocation is the frequency and time allocation that maps information for a particular UE to sub-carrier resources from a set of available sub-carriers as determined by the scheduler. This allocation may depend, for example, on the frequency-selective channel-quality indication (CQI) reported by the UE to the scheduler. The channel-coding rate and the modulation scheme, which may be different for different portions of the sub-carrier resources, are also determined by the scheduler and may also depend on the reported CQI. In some applications, the UE may not be assigned consecutive sub-carriers. For example, it could be assigned every Qth sub-carrier (equally spaced, non-consecutive) of the entire or a portion of the available system sub-carriers to improve frequency diversity. The available system sub-carriers may be grouped into one or more resource blocks (RB) wherein each resource block comprises the same (common) number of sub-carriers. A resource assignment to a UE can be a resource block or a fraction thereof. More generally, a resource assignment or allocation is a fraction of multiple resource blocks.

In one embodiment, a single TTI has a length of 1 ms or 2 ms wherein the TTI is segmented into two sub-frames each having a 0.5 ms length. Such a construction however implies the need to address multiple resource blocks, i.e., more than the number of resource blocks in a single 0.5 ms sub-frame, unless the resource block (RB) definition is expanded to automatically define the RB as extending over the entire length of the TTI, without regard for the TTI duration. This can lead to inefficiency, however, in the form of excessive per-RB capacity. In case the RB is defined to extend over a fraction of the length of the TTI, it would be possible to independently address each of the resource blocks in the multiple sub-frames making up the TTI. Accordingly mechanisms are required to signal resource assignments in the case of a frame or TTI composed of concatenated sub-frames. Furthermore, mechanisms are required to be able to assign resources based on the needs of individual UE wherein fewer resources are assigned to a UE served smaller packets while more resources are assigned to UE served with larger packets. In the case of UMTS (Universal Mobile Telecommunications System), a TTI is defined as the length of time over which a transmission or transport block is transmitted. A transmission block or transport block is composed of a block of jointly coded data protected by a single CRC. In the present instance, an alternate definition of TTI could be the length of transmission controlled by a single instance of control channel signaling.

In general, it is possible to define resource blocks of varying dimensionality in frequency and time domains to be operational simultaneously. Different terminals can then be signaled as to the resource block sizes that are operational for that particular terminal. For example, a TTI of 1 ms can be defined using two 0.5 ms sub-frames. In one embodiment, a first terminal can be assigned resources in this TTI using resource blocks consisting of 25 contiguous sub-carriers over a length of 1 ms, while a second terminal can be assigned resources using resource blocks consisting of 25 contiguous sub-carriers over a length of 0.5 ms. The former assignment could be useful in the case of terminals being served with data services requiring the transmission of long packets while the latter could be useful in the case of short packet services such as voice. Thus the resources within a single frame consisting of a continuum of concatenated sub-frames are logically divided into prototype or candidate resource blocks, that is, resource blocks of varying sizes super-posed over each other. Different terminals are signaled the assignment of these resource blocks by first pre-assigning the 'type' of resource block that is being assigned using higher layer or static signaling and then by dynamically assigning the respective resource block type using the control channel. In one embodiment, the resource blocks all have the same dimensions and are non-overlapping. In another embodiment, resource blocks may be defined in the spatial domain. In such a case, all resource blocks may have identical dimensions (frequency and time) and overlap spatially. SDMA transmission to two or more users in the same resource block may therefore be accomplished. In one embodiment of SDMA, paired (or more than two) users share the same resources in a frame, as the pairing is expected to be appropriate for the frame duration. Such resources may vary from sub-frame to sub-frame within the TTI, but vary in the same fashion to retain the pairing.

In one implementation, a scheduling entity allocates a first radio resource comprising at least one time-frequency resource block of a first minimum size, and allocates a second radio resource comprising at least one time-frequency resource block of a second minimum size, wherein the first and second radio resources are allocated from a common set of time-frequency radio resources. The first and second radio resources are allocated for use by at least one wireless communication terminal during a common transmit time interval constituting at least one sub-frame. More generally, the transmit time interval constitutes a concatenated series of at least two sub-frames. The first and second radio resources may be allocated to a common wireless communication terminal or to different terminals.

Figure 2:
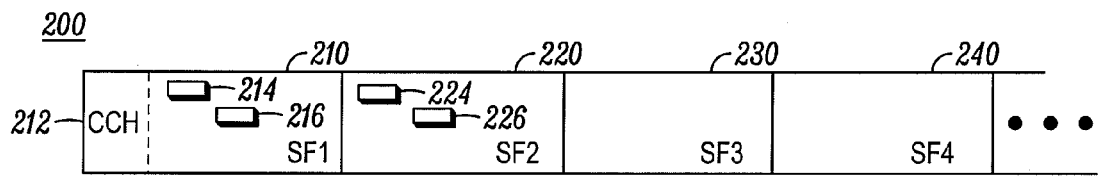
FIG. 2 illustrates a radio frame comprising multiple sub-frames and a control channel.

In FIG. 2, a radio frame 200 comprises a plurality of sub-frames 210, 220, 230, 240 . . . wherein each sub-frame includes time-frequency resource elements and at least one sub-frame includes a control channel. In some embodiments, the plurality of sub-frames forms a continuum of concatenated sub-frames as illustrated in FIG. 2. In other embodiments, sub-frames, for example, sub-frames containing multicast data, are interspersed within a chain of unicast frames. For example, 1 ms TTIs each comprised of 2 sub-frames may be time multiplexed with longer (e.g., 2.5 or 5 ms sub-frames) broadcast TTIs. The multiplexing may be restricted such that only certain combinations of 1 ms unicast and 2.5 ms multicast sub-frames are possible within the boundaries of a radio frame, e.g., a radio frame of length 10 ms.

In some embodiments, the control channel constitutes part of a single frame. In FIG. 2, for example, the control channel 212 is part of sub-frame 210. In other embodiments the control channel is distributed among several radio sub-frames. In yet another embodiment, a portion of the control channel could be contained within one sub-frame and transmitted in a TDM or TDM/FDM fashion by occupying the first one or two symbols, while the remaining part of the control channel is distributed among the many symbols making up one sub-frame or multiple sub-frames in a TDM/FDM fashion. In one example of a TDM/FDM control channel, the TDM portion in a first sub-frame may identify a user and an FDM resource allocation (resource block and/or sub-frame) on which the remainder of the in-band control information is sent. An uplink assignment may instead be sent in a frequency diverse fashion. In FIG. 2, the control channel is also shown distributed as control information 214 and 216 in sub-frame 210 and control channel information 224 and 226 in sub-frame 220. More typically, the control channel information is located in a single frame or distributed among two or more frames.

In one exemplary structure, the first sub-frame can carry control signaling for the downlink while the second carries control signaling for the uplink. This structure permits terminals engaged in data transfer in only one direction to avoid decoding the control channel in the second sub-frame. Individual control channels may be pre-assigned/signaled using the first sub-frame of the radio frame to permit dynamic control channel assignment. This would still permit the use of the control channel resources for data transmission in the event the scheduler does not require the control channel for signaling.

In another embodiment, the first sub-frame of a 1 ms TTI contains control signaling for downlink assignments while the second sub-frame contains control signaling for uplink assignments. The signaling for the uplink assignments may be made in a frequency diverse manner, as it is likely that the network does not have information about the channel conditions experienced by the terminal.

In another embodiment, the resource blocks in a TTI and more generally in a sub-frame making up the TTI can be divided into frequency diverse and frequency non-diverse resource blocks. Such a mapping may be pre-defined based upon the number of such blocks. For example, if 6 of 12 resource blocks are to be frequency diverse, they may comprise every other resource block. Different assignment patterns may also be defined for both frequency diverse and non-diverse resource blocks with the operational pattern being signaled either statically or through higher layer signaling. Frequency diverse allocations may be indicated through a common network environment, for example, system frame number, base station identifier, etc. In some embodiments where the time period between changes of the frequency diverse resource blocks is infrequent, the feedback mechanism, e.g., CQI, for the channel dependent (frequency selective) blocks can be reduced in bandwidth by not sending CQI for frequency diverse resource blocks. In addition, dynamic signaling on the control channel, such as having frequency diverse resource blocks comprise the resource blocks remaining after channel dependent resource allocations are assigned.

Figure 3:
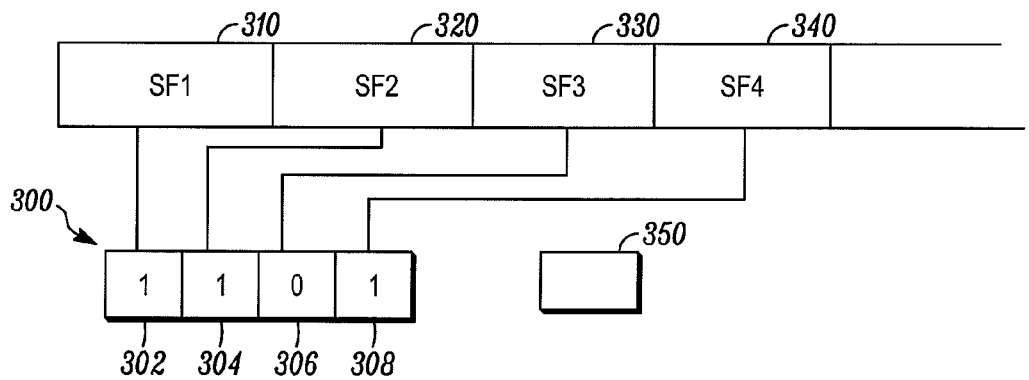
FIG. 3 illustrates radio frame comprising multiple sub-frames and a control channel including resource allocation fields.
Figure 5:
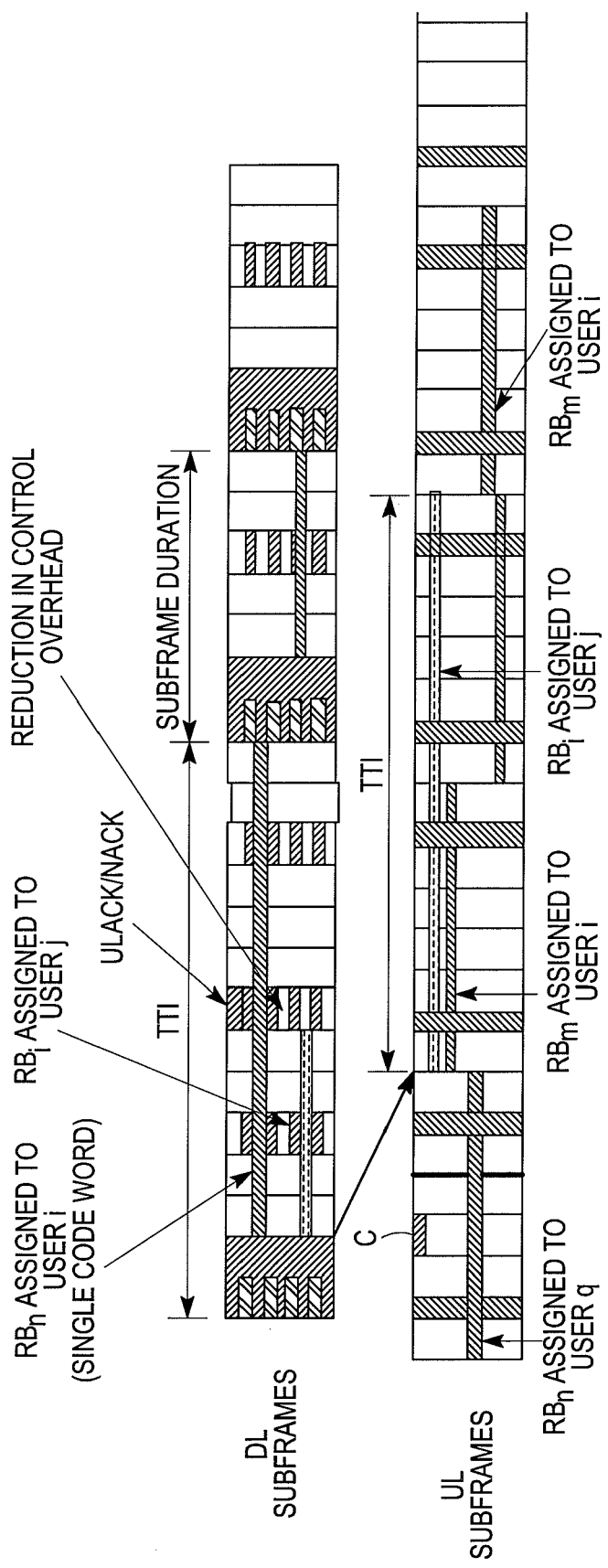
FIG. 5 illustrates another radio frame comprising multiple sub-frames.

Generally, according to one aspect of the disclosure, a control channel provides radio resource allocation information for two or more sub-frames. In one embodiment, the control channel includes a plurality of resource allocation fields, for example, a bit map, wherein each resource allocation field is associated with at least one corresponding sub-frame. In FIG. 3, for example, the control channel includes a bit map 300 comprising multiple allocation fields 302, 304, 306 and 308. The plurality of resource allocation fields are used to indicate a resource assignment to the wireless communication device. For the case where the resource allocation fields 302, 304, 306 and 308 in FIG. 3 are associated with sub-frames 310, 320, 330 and 340, the bit map 300 configuration [1 1 0 1] may be interpreted to mean that time-frequency resources in sub-frames 310, 320 and 340 have been allocated to the wireless communication terminal. In other embodiments, each bit could indicate that resources in more than one sub-frame have been assigned or allocated to the terminal. In other embodiments, the radio resource allocation to the mobile station may be indicated by pre-encoding the bits in the allocation fields. For example, the terminal may reference a look-up table to determine which resources are allocated by a particular combination of bits in the field. FIG. 5 shows an exemplary embodiment with a 1 ms TTI comprised of two 0.5 ms sub-frames. User i is assigned a resource block over both sub-frames, while user j is assigned is assigned a resource block only over 1 sub-frame.

In another embodiment, a frequency diverse resource assignment is indicated by a frequency diverse allocation field. A frequency diverse resource assignment or allocation is a resource allocation wherein the frequency allocation changes among sub-frames. In FIG. 3, for example, at least the frequency component of a time-frequency allocation in sub-frame 310 is different than the frequency component of the time-frequency allocation in sub-frame 320. In some embodiments, the frequency diverse allocation field constitutes part of the control channel, and in other embodiments the frequency diverse allocation field is communicated to the wireless communication terminal over another channel, for example, via layer 3 signaling.

In one implementation, illustrated in FIG. 3, the frequency diverse allocation field 350 is a single bit that indicates to the wireless communication terminal that a radio resource allocation is frequency diverse. In such an implementation, the terminal may use a pre-specified frequency diverse allocation scheme indicated by the frequency diverse allocation field. The pre-specified frequency diverse allocation scheme may be based on the order of the resource allocation to the wireless communication device, or it may be based upon sub-frame numbering information, or the cell in which the terminal is located. More generally, however, a different temporal dimension of the resource allocation may also be indicated in addition to the change in frequency allocation. Alternatively, a change in the temporal allocation may be indicated by some other bit or information field.

Figure 4:
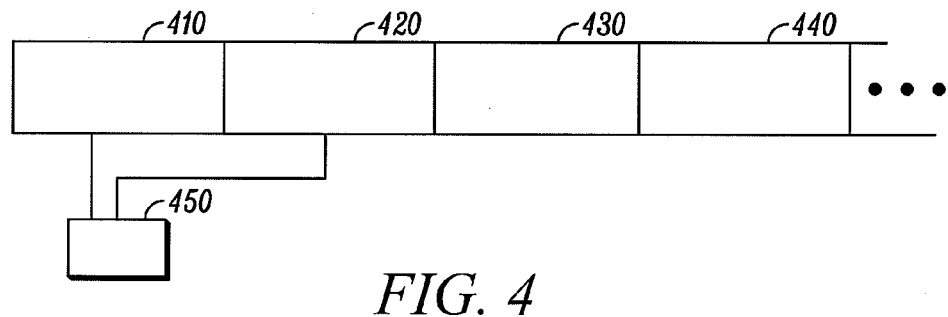
FIG. 4 illustrates another radio frame comprising multiple sub-frames and a control channel including resource allocation fields.

In another embodiment, a frequency diverse allocation field resides on the control channel wherein the frequency diverse allocation field indicates frequency diverse resource allocations in multiple sub-frames of the radio frame. In one embodiment, the frequency diverse allocation field resides on a single control channel, wherein the frequency diverse allocation field indicates frequency diverse resource allocations in multiple sub-frames of the radio frame. In FIG. 4, for example, the radio frame 400 comprises sub-frames 410, 420, 430, 440 . . . . In one embodiment, a frequency diverse allocation field resides on a control channel associated with two or more sub-frames, wherein the frequency diverse allocation field indicates frequency diverse resource allocations in multiple sub-frames of the radio frame. In FIG. 4, the frequency diverse allocation field 450 indicates frequency diverse resource allocations in sub-frames 410 and 420.

The allocation corresponding to a particular bit setting or a particular combination of bits may be known a priori by the terminal. In one embodiment, a single bit is used to indicate whether the terminal should use frequency diversity. When a frequency diverse allocation is indicated, the particular allocation may be indicated by some other fields or it may be known a priori. For example, the allocation may be based on the order in which the allocation is made by the scheduler or based upon some other factor or criterion. In one embodiment, the frequency diverse allocation field is a bit map comprising one or more bits. The bits may be used to encode different frequency diverse allocations. In one embodiment, the terminal references a look-up table to determine what frequency diverse allocation corresponds to a particular bit combination.

Additional signaling may indicate any of the following possible resource allocations: The UE is assigned the same resource block in the second (and any subsequent) sub-frame(s) of the TTI; or the resource allocation corresponds to a frequency hopped (diverse) resource block; or there is no further assignment in the frame wherein the term "frame" in this disclosure refers to a multi-sub-frame TTI structure. The above set of enumerated possibilities would require a 2 bit field. Another 2 bit example is to signal, in addition to the resource allocation, the following:

| Bits | Meaning |
|------|---------|
| 00   | Both sub-frames |
| 01   | Both sub-frames, hopping |
| 10   | $1^{st}$ sub-frame only |
| 11   | $2^{nd}$ sub-frame only |

In this example, 'hopping' indicates a known method of changing the resource allocation from one sub-frame to another. For example, a fixed cell-specific offset (modulo the number of resource blocks) may be applied to all resource blocks.

More generally, additional control fields may also be used. For example, a single bit could be used to indicate a contiguous assignment or a frequency diverse pattern, and a bitmap could signal the assignment over the TTI wherein the bitmap length is dictated by the number of concatenated sub frames forming the TTI. In this instance, the assignment of a 'logical' resource block is applicable, where the mapping, i.e. frequency diversity, between the logical and physical resource block (RB) locations in each component sub-frame of the TTI may be constant, i.e. the mapping defined for the first sub-frame of the TTI remains applicable to subsequent sub-frames, or may vary from sub-frame to sub-frame, where it is understood that the logical assignment is constant and only the mapping varies.

In frequency diverse allocation applications, the idea can be extended even in the case where an odd number of sub-frames, or generally more than 2 sub-frames, make up a TTI. In this case, one bit can indicate whether the assignment includes a frequency diverse allocation pattern, i.e. time-varying logical to physical resource block mapping, or whether the same allocation is being extended over the length of the frame (TTI) in order to optimally support frequency selective or frequency diverse scheduling methods. A separate bitmap can indicate whether the terminal is being assigned a logical resource block in each of the sub-frames making up the TTI regardless of whether frequency diversity is enabled.

In one embodiment, a small set of patterns is assigned statically using higher layer signaling, or semi-statically, and then indexed in the dynamic control using the above mentioned bit-map. In another embodiment, this set of patterns could be made dependent on TTI location in a 10 ms radio frame or similar super frame.

In another embodiment, the frequency diverse allocation pattern can be signaled to be applicable to multiple or all users addressed in a particular TTI. The applicable pattern can be determined based on the order in which the terminal is addressed. Additional signaling may be required to signal which of the embodiments was made operational in the event that more than one scheme is supported.

In some embodiments, it may be more complex to permit one assigned user in the TTI to operate on a frequency diverse allocation while other users do not, since this would require the logical-physical channel mapping to exclude physical resource blocks declared as being assigned to non-frequency diverse users. Accordingly, in some implementations, a single control bit may be asserted which is globally applicable to all users in the sub-frame, and which enables or disables frequency diversity for the entire TTI.

When considering implementations where control information is transmitted on or more of the sub-frames of the TTI, the control information transmission may be made with separate coding or joint coding. With separate coding, a UE's control information is not coded together with another UE's control information. In this case bits indicating an assigned subfield or frequency hopping are added to fields constituting the separate assignment. In some cases, blind decoding of potential allocations (e.g., the UE keeps decoding the RB across additional sub-frames of the TTI until a CRC checks) may be used to reduce signaling. For example, a UE may decode each of a number, e.g. 12, resource blocks looking for a downlink control channel assignment corresponding to that UE. If an assignment is found within a RB, that RB can point to other RBs for a data assignment. This indication of other RBs may be in a number of contiguous RBs or via a bitmap. Blind decoding complexity can be reduced by making the RB with the separate control channel assignment be one of the RBs reported on with channel quality indication information.

Joint coding offers efficient source coding of user IDs and resource allocations, in addition to the addressing and frequency diverse bits of the disclosure. In one embodiment, user IDs are listed in an order that determines a short ID, for example, 2 bits for 4 users. Then, in the order of the available RBs the short IDs (or a null ID) are listed. In one embodiment, two short IDs are assigned per RB. In another embodiment, the 1-2 bits are assigned per ID and associated with the short ID. In this case, every RB to a user is treated in the same manner. In another embodiment, a frequency diverse bit may be sent once per frame, applied to all terminals. In yet another embodiment, retransmissions may be done in an a priori manner requiring less signaling, or signaling only in the first transmission.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication scheduling entity, the method comprising:
   allocating a first radio resource comprising at least one time-frequency resource block, the at least one time-frequency resource block of the first radio resource having a first size,
   a duration of the at least one time-frequency resource block of the first radio resource corresponding to a duration of at least one sub-frame; and
   allocating a second radio resource comprising at least one time-frequency resource block, the at least one time-frequency resource block of the second radio resource having a second size, the second size different than the first size, a duration of the at least one time-frequency resource block of the second radio resource corresponding to at least the duration of the at least one sub-frame, the at least one sub-frame constitutes part of a transmit time interval, the first and second radio resources are allocated for use by at least one wireless communication terminal during the transmit time interval.

2. The method of claim 1, the transmit time interval comprising a concatenated series of at least two sub-frames.

3. The method of claim 1, allocating the first and second radio resources to a common wireless communication terminal.

4. The method of claim 1, allocating the first and second radio resources to different wireless communication terminals.

5. The method of claim 1, the transmit time interval is defined as a length of time over which a transport block is transmitted wherein the transport block comprises a block of jointly coded data.

6. The method of claim 5, wherein the block of jointly coded data is protected by a common cyclic redundancy check.

7. The method of claim 1, the transmit time interval corresponds to a transmission duration controlled by a single instance of control channel signaling.

8. The method of claim 1,
the transmit time interval comprising first and second concatenated sub-frames,
the duration of the at least one time-frequency resource block of the first radio resource corresponding to a duration of the first sub-frame,
the duration of the at least one time-frequency resource block of the second radio resource corresponding to a duration of both the first sub-frame and the second sub-frame.

9. The method of claim 1, the at least one time-frequency resource block of the first radio resource having a frequency dimension that is different than a frequency dimension of the at least one time-frequency resource block of the second radio resource.

10. A method in a wireless communication terminal that communicates using orthogonal frequency-division multiplexing (OFDM), with a wireless base station, the method comprising:
receiving, from the base station, a radio resource allocation on a control channel in a radio frame,
wherein the radio frame comprises at least a first subframe and a second subframe subsequent to the first subframe, each subframe comprising a plurality of OFDM symbols,
the radio resource allocation allocating resources for one or more subframes,
the control channel including a plurality of resource allocation fields,
determining, at the wireless communication terminal, that the resource allocation is for either a resource block in both the first and second subframes or for a resource block in the second subframe only.

11. The method of claim 10, determining at the wireless communication terminal, that the resource allocation is for a same resource block in both the first and second subframes.

12. A wireless communication scheduling entity comprising:
a transceiver coupled to a scheduler,
the scheduler configured to allocate a first radio resource comprising at least one time-frequency resource block having a first size, a duration of the at least one time-frequency resource block corresponding to a duration of at least one sub-frame; and
the scheduler configured to allocate a second radio resource comprising at least one time-frequency resource block having a second size, the second size different than the first size, a duration of the at least one time-frequency resource block of the second radio resource corresponding to at least the duration of the at least one sub-frame,
the at least one sub-frame constitutes part of a transmit time interval,
wherein the first and second radio resources are allocated for use by at least one wireless communication terminal during the transmit time interval.

13. The entity of claim 12, the transmit time interval comprising a concatenated series of at least two sub-frames.

14. The entity of claim 12, the scheduler configured to allocate the first and second radio resources to a common wireless communication terminal.

15. The entity of claim 12, the scheduler configured to allocate the first and second radio resources to different wireless communication terminals.

16. The entity of claim 12, the transmit time interval is defined as a length of time over which a transport block is transmitted wherein the transport block comprises a block of jointly coded data.

17. The entity of claim 16, wherein the block of jointly coded data is protected by a common cyclic redundancy check.

18. The entity of claim 12, the transmit time interval corresponds to a transmission duration controlled by a single instance of control channel signaling.

19. The entity of claim 12,
the transmit time interval comprising first and second concatenated sub-frames,
the duration of the at least one time-frequency resource block of the first radio resource corresponding to a duration of the first sub-frame,
the duration of the at least one time-frequency resource block of the second radio resource corresponding to a duration of both the first sub-frame and the second sub-frame.

20. The entity of claim 12, the at least one time-frequency resource block of the first radio resource having a frequency dimension that is different than a frequency dimension of the at least one time-frequency resource block of the second radio resource.

* * * * *